United States Patent [19]
Menshen

[11] 3,856,244
[45] Dec. 24, 1974

[54] CLAMPING APPARATUS

[76] Inventor: Arnold Menshen, Beuler-Weg 52, Neuenrade Westf., Germany

[22] Filed: July 26, 1972

[21] Appl. No.: 275,338

[52] U.S. Cl. ............................. 248/54 R, 248/67.5
[51] Int. Cl. ........................... 248 68 CB, F16l 3/02
[58] Field of Search ............ 248/68 R, 68 CB, 74 R, 248/49, 54 R, 67.5; 174/155–157

[56] References Cited
UNITED STATES PATENTS

| | | | |
|---|---|---|---|
| 296,558 | 4/1884 | Haines et al. ........................ | 174/157 |
| 2,417,260 | 3/1947 | Morehouse ................. | 248/68 CB X |
| 2,425,935 | 8/1947 | Hayman ..................... | 248/68 CB X |
| 2,937,835 | 5/1960 | Csmereka ........................ | 248/74 R |
| 3,563,504 | 2/1971 | Gordon et al. .................... | 248/68 R |
| 3,568,980 | 3/1971 | Hulburt et al. .................... | 248/74 R |
| 3,582,029 | 6/1971 | Moesta ............................. | 248/68 R |
| 3,592,427 | 7/1971 | Misuraca ....................... | 248/68 CB |
| 3,606,218 | 9/1971 | Enlund et al. .................... | 248/54 R |
| 3,682,422 | 8/1972 | Evans ............................ | 248/68 CB |

FOREIGN PATENTS OR APPLICATIONS

| | | | |
|---|---|---|---|
| 143,822 | 2/1931 | Switzerland ...................... | 174/157 |

*Primary Examiner*—Roy D. Frazier
*Assistant Examiner*—Rodney H. Bonck
*Attorney, Agent, or Firm*—Popper, Bain, Bobis, Gilfillan & Rhodes

[57] ABSTRACT

Clamping apparatus for clamping a plurality of longitudinally extending members in a predetermined spaced apart relationship, including a plurality of discrete clamping members providing, upon the assembly thereof in a predetermined relationship with respect to each other, a plurality of longitudinally extending apertures spaced apart in the predetermined relationship and for receiving the longitudinally extending members; and securing means providing the ready asembly and disassembly of the clamping members, and upon the receipt of the longitudinally extending members in the apertures, said means for securing the clamping members, in a predetermined fixed relationship with respect to each other and for causing the clamping members to clamp the longitudinally extending members in the apertures and in the spaced apart relationship.

3 Claims, 4 Drawing Figures

PATENTED DEC 24 1974 3,856,244

CLAMPING APPARATUS

BACKGROUND OF THE INVENTION

1. Field of the Invention

This invention relates to clamping apparatus in general and in particular, apparatus for clamping a plurality of longitudinally extending members, such as for example pipes, in a predetermined spaced apart relationship.

2. Description of the Prior Art

The prior art is replete with many different types of clamping apparatus, however, a long felt need in the prior art is for clamping apparatus which may be readily assembled disassembled, which may be used to clamp two pipes with only one bolt, and which includes resilient, e.g., plastic, clamping members for engaging pipes and yet which includes structure permitting the clamping apparatus to be welded to a metal support surface.

SUMMARY

The clamping apparatus of the present invention solves the above-noted long felt needs in the clamping apparatus art and provides clamping apparatus which may be readily assembled and disassembled and which may be utilized to secure at least two pipes with a single bolt. In addition, the clamping apparatus of the present invention, while providing resilient clamping members for actually engaging the pipes to be clamped, also includes structure permitting the clamping apparatus to be welded to a metal support surface.

DESCRIPTION OF THE PREFERRED EMBODIMENT

Figure 1:
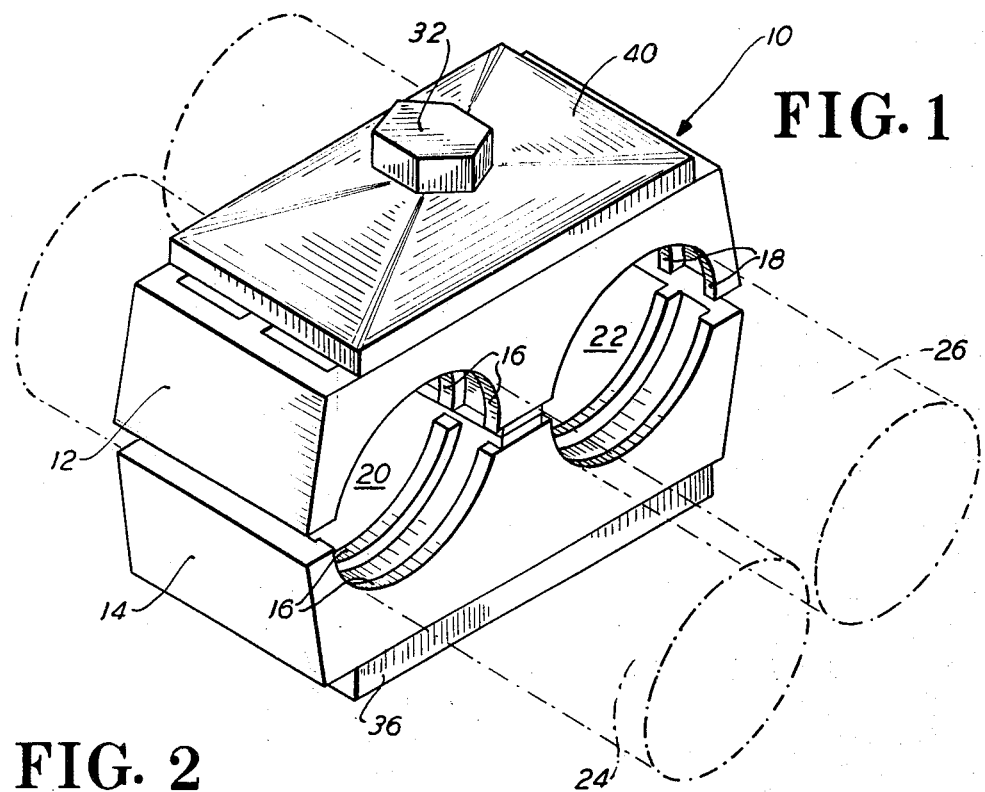
FIG. 1 is a diagrammatic view of clamping apparatus embodying the present invention.

Referring to FIG. 1, there is shown clamping apparatus indicated by the general numerical designation 10 which embodies the present invention. The clamping apparatus includes a pair of clamping members 12 and 14 which are each provided with two groups of inwardly directed, parallel, arcuate, ridge or ridge-like members 16 and 18 identified and shown variously in the FIGS. of the drawings. The central portions of the clamping members 12 and 14 are provided with spacer means 13 and 15, respectively.

Figure 2:
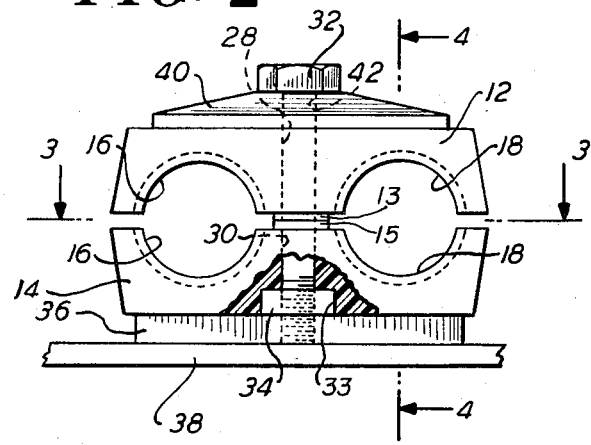
FIG. 2 is a plan view of clamping apparatus embodying the present invention.
Figure 3:
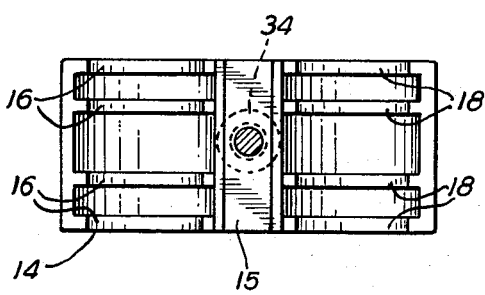
FIG. 3 is a cross-sectional view taken generally along the line 3—3 in FIG. 2 in the direction of the arrows.

Upon the assembly of the clamping members 12 and 14 as shown in the drawings, the groups 16 and 18 of ridge-like members are placed opposite to each other, as shown, and the groups of ridge like members cooperatively provide two partially closed, longitudinally extending, interrupted apertures 20 and 22 having parallel, longitudinal axes. The interrupted apertures are formed by the engagement of the centrally positioned spacer means 13 and 15 with each other and the spacings of the outer ends of the clamping members 12 and 14 from each other as shown in FIG. 2. The apertures 20 and 22 are for receiving longitudinally extending members 24 and 26, such as for example pipes, and are for engaging such longitudinally extending members.

The clamping members 12 and 14 are provided with centrally formed apertures 28 and 30, respectively, which apertures are formed in a direction perpendicular to the longitudinal axes of the above-mentioned longitudinally extending apertures 20 and 22. Upon the clamping members 12 and 14 being assembled, as shown, the centrally formed apertures 28 and 30 are aligned and are for receiving a suitable threaded fastener such as the bolt 32 having a hexagonal head formed on one end thereof and having the other end thereof provided with threads as shown in FIGS. 2 and 4.

As may be best seen in FIG. 2, the lower clamping member 14 is provided with a counterbore 33 which is coincident with its centrally formed apertures 30. The counterbore 33 is for receiving the boss 34 formed on the welding plate 36. The welding plate 36 permits the clamping apparatus 10 to be fixedly secured to a metal surface, as for example, the generally indicated metal surface 38 of FIG. 2. The boss 34 is provided with a threaded aperture formed centrally thereof and is for threadedly engaging the threaded fastener 32.

Figure 4:
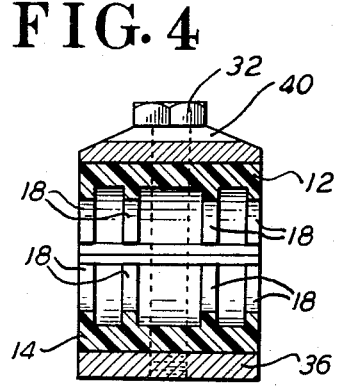
FIG. 4 is a cross-sectional view taken generally along the line 4—4 in FIG. 2 and in the direction of the arrows.

The clamping apparatus 10, as may be seen in FIGS. 1, 2 and 4 also includes a clamping plate 40 which engages the clamping member 12 and which is provided also with a centrally formed aperture 42 for being aligned with the centrally formed apertures 28 and 30 and also for receiving the threaded fastener 32. The clamping members 12 and 14 are made of a suitable resilient material, such as plastic, and the clamping plate 40 is of a material more rigid than plastic, such as for example a suitable metal such as steel. It has been found that the clamping members 12 and 14 may be made advantageously of the plastic materials Polypropylene PPN (specific gravity 0.906) and Ultramid A 4K (specific gravity 1.12 to 1.15). These materials are particularly advantageous due to their ability to dampen vibrations and shocks and to absorb noise.

Referring again generally to the clamping apparatus 10 of the present invention, upon clamping members 12 and 14 being assembled as shown, and upon the longitudinally extending members 24 and 26 being received within the apertures 20 and 22, as indicated in FIG. 1, the threaded fastener 32 is placed in threaded engagement with the threads formed in the boss 32 of the welding plate 36 whereby the resilient clamping members are compressed together by the clamping plate 40 and the welding plate 36 to cause the groups of ridge-like members 16 and 18 to resiliently engage the longitudinally extending members 24 and 26 and clamp such longitudinally extending members in a predetermined spaced apart relationship, such as for example, the spaced apart parallel relationship shown in FIG. 1.

It will be appreciated by those skilled in the art that the above-described clamping apparatus of the present invention permits ready assembly and disassembly thereby permitting longitudinally extending members, such as for example hydraulic pipes, to be repeatedly installed and replaced in a minimum of time thereby avoiding undesirable idle conditions. Further, it will be appreciated that the clamping apparatus of the present invention permits a number of longitudinally extending members, for example pipes, to be accommodated in a minimum space in a neat and orderly fashion.

It will be further appreciated by those skilled in the art that while the specific embodiment of the clamping apparatus of the present invention as shown in the above-described drawings provides longitudinally extending apertures 20 and 22 of the same diameter, that it is within the contemplation of the present invention that such diameters 20 and 22 may be of different diameters whereby pipes of different diameters may be clamped by the clamping apparatus of the present invention. It will be appreciated still further by those skilled in the art that the clamping apparatus of the present invention may be mounted otherwise than by the welding plate 36, for example, the clamping apparatus of the present invention may be mounted by suitable bolts or nuts of angles or channels, or, the clamping apparatus may be mounted on structural or machine parts where welding is not permitted by being fastened directly by means of a tapped hole.

It will be appreciated still further by those skilled in the art that many modifications and variations of the present invention are possible in the light of the above teachings. It is therefore to be understood that the invention may be practiced otherwise than as specifically described.

I claim:

1. Clamping apparatus for clamping a plurality of longitudinally extending members in a predetermined spaced apart relationship, comprising:

a pair of clamping members, each of said clamping members provided with at least two groups of inwardly directed parallel, arcuate, ridge-like members, and a centrally positioned spacer means, and upon the assembly of said clamping members in a predetermined opposed relationship, said groups of ridge-like members formed in each clamping member being placed opposite the groups of ridge-like members formed in the other clamping member with said spacer means engaging each other whereby said groups of ridge-like members cooperatively provide two partially closed, longitudinally extending interrupted apertures having parallel longitudinal axes, said apertures for receiving said longitudinally extending members and said ridge-like members for engaging said longitudinally extending members;

said clamping members, including said ridge-like members, being of a predetermined resilient material for dampening vibrations and shocks and for absorbing noise;

each of said clamping members having an aperture formed centrally thereof, in a direction perpendicular to the said longitudinal axes of said longitudinally extending apertures, and upon said assembly of said clamping members, said apertures being aligned and receiving a threaded fastener;

at least one of said clamping members having a counterbore formed centrally thereof coincident with said aperture formed centrally thereof, said counter-bore being formed in said one clamping member generally opposite said two groups of ridge-like members formed therein;

a metal welding plate having a boss formed centrally on one surface thereof and having a threaded aperture formed centrally thereof and through said boss, said welding plate permitting the welding of said clamping apparatus to a metal support surface;

said metal welding plate for engaging said clamping member having said counter-bore formed centrally thereof and having its boss received within said counter-bore and having its threaded aperture aligned with said aperture formed centrally of said clamping member;

a threaded fastener having a bolt head formed on one end thereof and the other end thereof having threads formed thereon;

a clamping plate having an aperture formed centrally thereof for receiving said threaded fastener, said clamping plate being of a material more rigid than said predetermined resilient material of said clamping members, said clamping plate engaging the other of said clamping members and having its aperture aligned with said aperture formed centrally of said other clamping member;

upon said clamping members being assembled as said and said longitudinally extending members being received within said apertures formed by said ridge-like members, and upon said welding plate and cover plate being in engagement with said clamping members as said, said threaded fastener being received within said centrally formed apertures with said bolt head engaging said cover plate and said threads being placed in threaded engagement with said threads formed in said welding plate whereby said resilient clamping members are compressed together by said clamping plate and said welding plate to cause said ridge-like members to resiliently engage said longitudinally extending members and clamp said longitudinally extending members in said predetermined spaced apart relationship.

2. Clamping apparatus according to claim 1 wherein said clamping member predetermined resilient material is plastic and wherein said clamping plate material is metal.

3. Clamping apparatus according to claim 1 wherein said plastic is Polypropylene.

* * * * *